Figure 3:
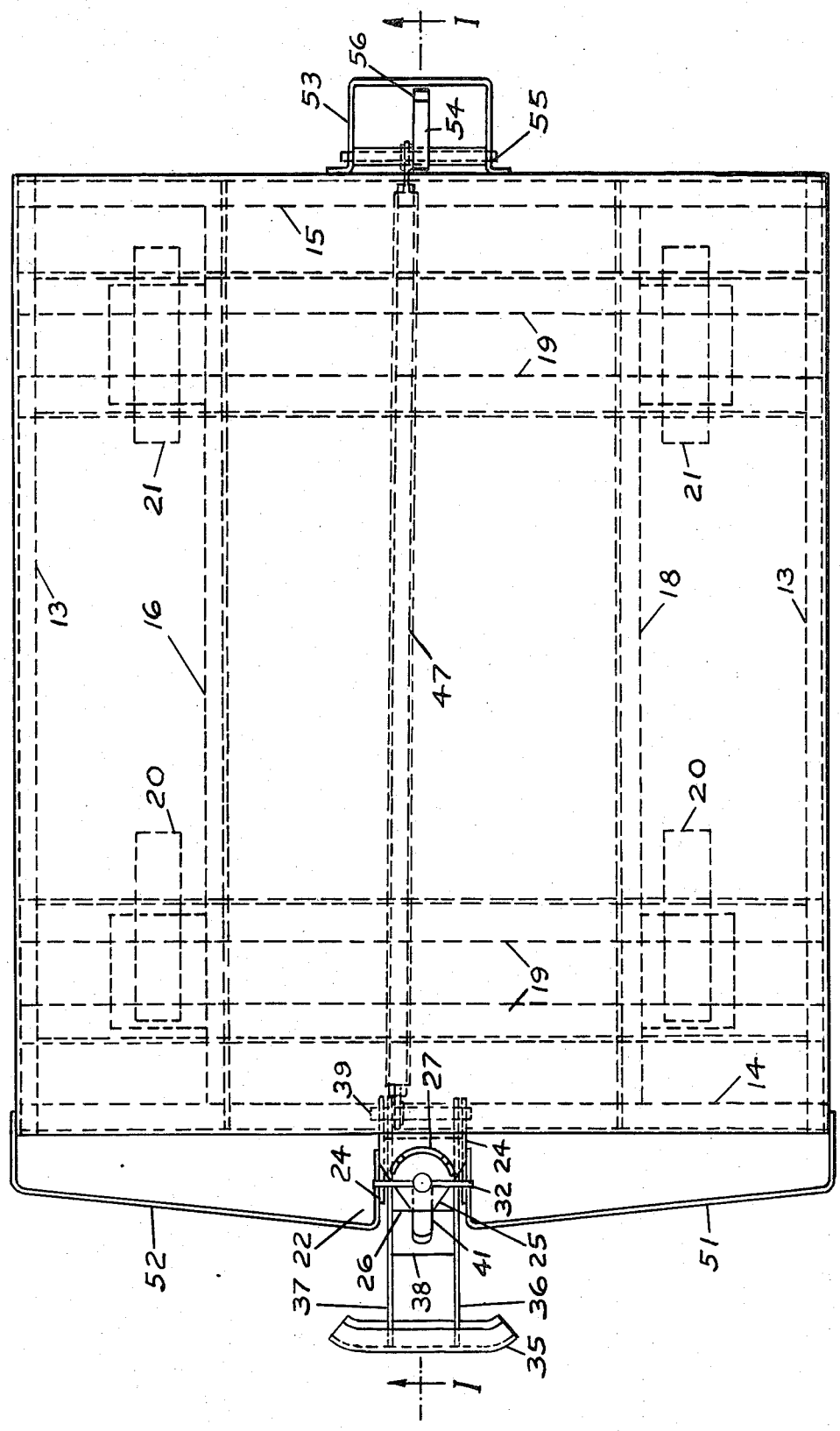

United States Patent [19]
Klamp

[11] 3,810,428
[45] May 14, 1974

[54] SUBFLOOR CONVEYOR TOW TRUCKS

[76] Inventor: Paul Klamp, 22730 St. Joan Ave., St. Clair Shores, Mich. 48081

[22] Filed: Mar. 13, 1972

[21] Appl. No.: 233,908

[52] U.S. Cl. ............................... 104/172 BT
[51] Int. Cl. ..................................... B65g 17/42
[58] Field of Search ......................... 104/172 BT

[56] References Cited
UNITED STATES PATENTS

| | | | |
|---|---|---|---|
| 3,589,301 | 6/1971 | Reagan | 104/172 BT |
| 3,415,200 | 12/1968 | Bishop et al. | 104/172 BT |
| 3,467,023 | 9/1969 | Dodds et al. | 104/172 BT |
| 3,581,670 | 6/1971 | Larivee | 104/172 BT |
| 3,636,884 | 1/1972 | Kavieff | 104/172 BT |

Primary Examiner—Albert J. Makay
Assistant Examiner—Richard A. Bertsch

[57] ABSTRACT

The invention relates to subfloor conveyor tow trucks which are propelled by an endless chain with equally spaced pusher dogs, said chain and pusher dogs being positioned below floor level, while each tow truck is equipped with a tow pin which projects downward through a slit in the floor and is adapted to be engaged by one of the pusher dogs in order to propel the tow truck along the path the chain, where each tow truck is equipped with an accumulation bumper which, upon contact with a stationary tow truck or other obstruction, lifts the tow pin clear of the pusher dog, the tow truck being featured, according to the invention, by a novel and simpler anti-rebound device.

7 Claims, 4 Drawing Figures

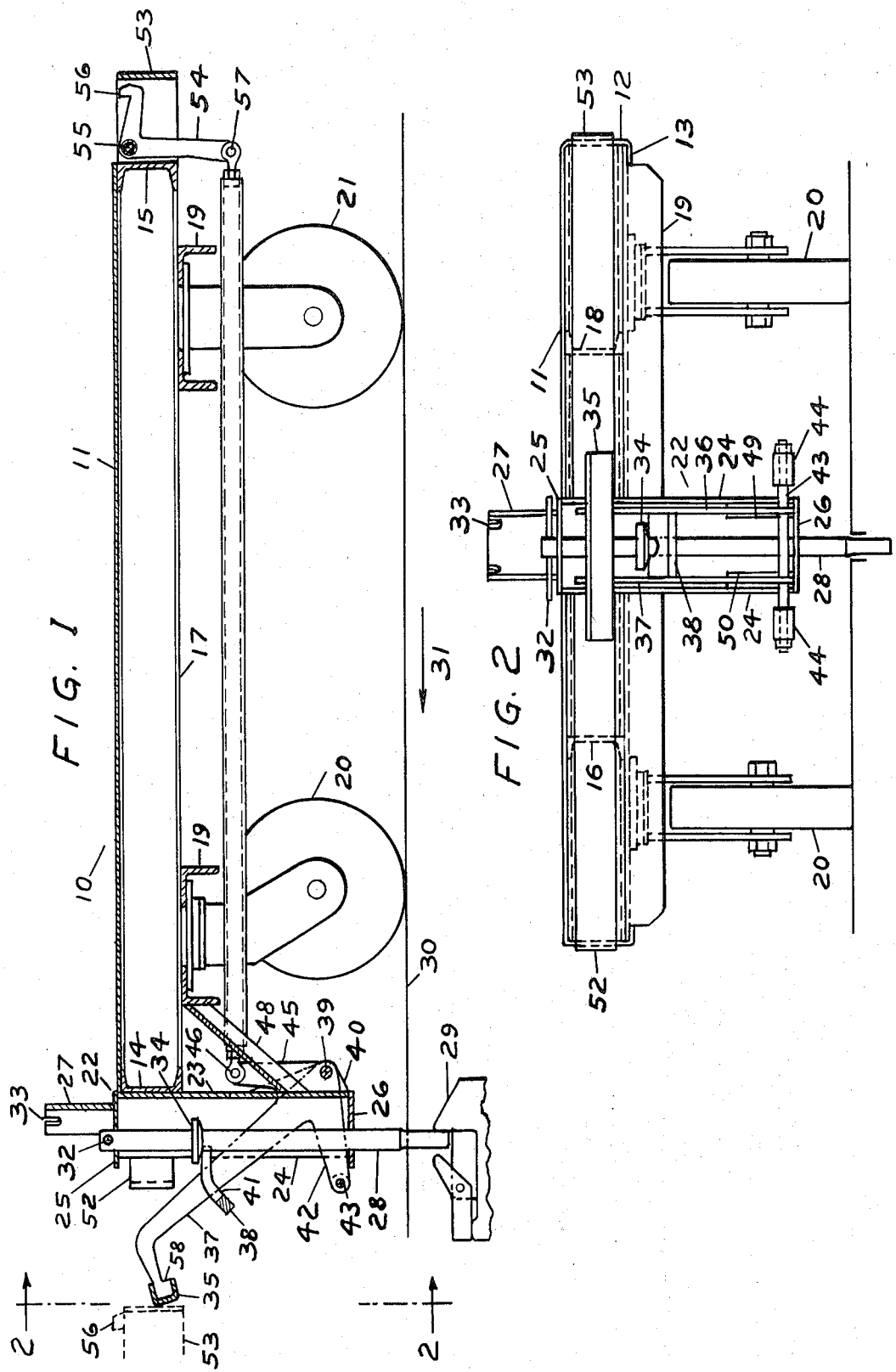

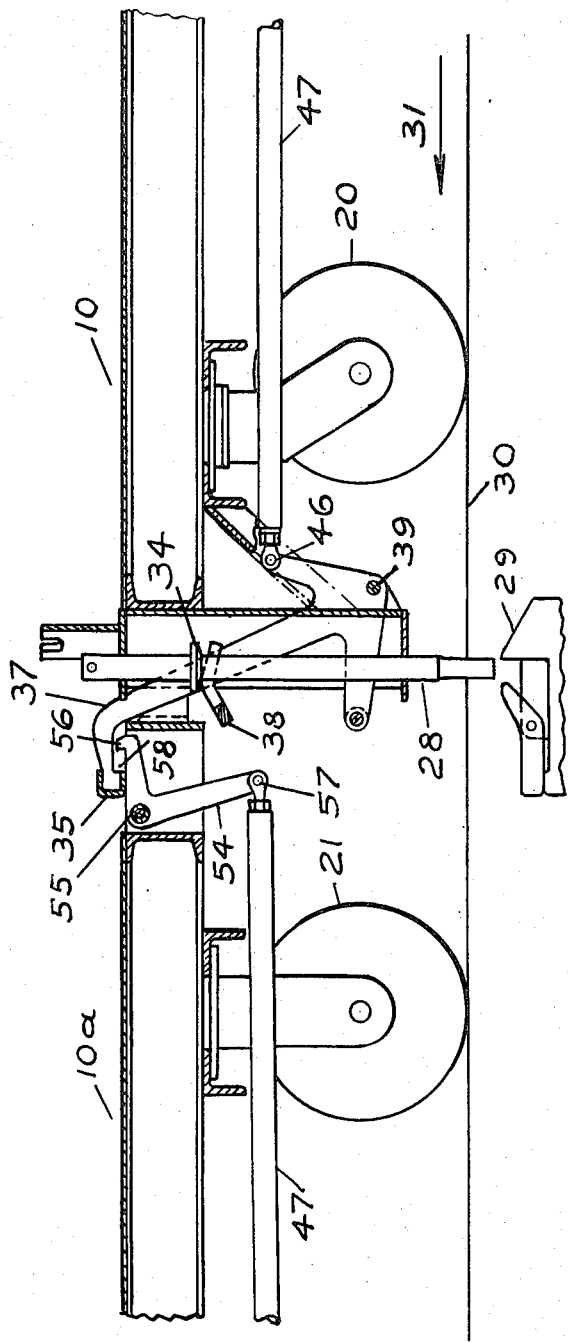

SUBFLOOR CONVEYOR TOW TRUCKS

Anti-rebound devices of different constructions have been used for subfloor conveyor tow trucks heretofore. One type is the shock absorber unit 43 in my U.S. Pat. No. 3,015,284. This device consists of parts 44 to 58. Another type involves the utilization of rear wheel brakes which are set when the front bumper of a moving tow truck encounters a stationary tow truck or other obstacle. One example of this type is covered by my U.S. Pat. No. 3,503,338.

The object of the present invention is to provide an anti-rebound device which is much simpler than those mentioned above and does not require a specially designed tow truck body frame, thus greatly reducing the cost of a subfloor tow truck conveyor installation. This object will become more apparent as this description proceeds, when considered in connection with the accompanying drawings which illustrate a preferred embodiment of the invention wherein FIG. 1 is a longitudinal sectional elevation of the tow truck on line 1—1 in FIG. 3, FIG. 2 is a front elevation on line 2—2 in FIG. 1, FIG. 3 is a plan view, and FIG. 4 is a longitudinal sectional elevation of the front half 10 of a tow truck having accumulated behind a preceeding stationary tow truck 10a, the rear half of which is shown.

TOW TRUCK FRAME

The improved subfloor conveyor tow truck or load carrier is generally designated by the numeral 10. The frame of the tow truck includes a deck plate 11 which is bent down and then inwards on two sides as shown by numbers 12 and 13 in FIG. 2, thus forming a skirt at each side of the tow truck. Below the deck are two end members 14 and 15 which are of U-shaped cross section and are welded to three longitudinal members 16, 17 and 18, also of U-shaped cross section. Member 17 is parallel to and centrally between members 16 and 18 but is not shown in FIG. 3 for the sake of clarity. It is shown in FIG. 1 and FIG. 4. Welded to the underside of channels 16, 17 and 18 and to the side skirts of the deck plate are four angles 19 to the underside of which four wheels are mounted. The front wheels 20 are swivel casters while the rear wheels 21 are rigid casters.

TOW PIN HOUSING

As shown in FIG. 1, 2 and 3, a tow pin housing 22 is welded to the end member 14. The housing is of welded construction and consists of a back plate 23, two side plates 24, a top plate 25 and a bottom plate 26. A tow pin guard 27 is welded to the top of plate 25. The top plate 25 and the bottom plate 26 are provided with a round hole each for guiding of the tow pin 28 for for vertical movement. A drive chain pusher dog 29 located below the floor level 30 propels the truck in the direction 31. A handle bar 32 fastened to the upper end of the tow pin serves to lift the tow pin above the floor line to allow the tow truck to be manually removed from the conveyor line. It is nested in one of the two slots 33 to hold it up for this purpose. For automatic lifting of the tow pin, clear of pusher dog 29, a collar 34 is welded to the tow pin.

FRONT BUMPER ASSEMBLY

The main portion of the front bumper assembly consists of a movable accumulation bumper 35 which is welded to two arms 36 and 37. Bridging the space between the arms is a lifting cam 38 which is welded to them. The arms 36 and 37 are pivoted at 39 to two rearward extensions 40 of the two tow pin housing side plates 24. The lift cam 38 has an open-end slot 41 to clear the tow pin when the accumulation bumper 35 is rotated clockwise around pivot 39 which also causes the sides of slot 41 which are in engagement with the underside of collar 34 to lift the tow pin. Arms 36 and 37 have a lower forward extension 42 each to which a pin 43 is fastened. This pin carries a roller 44 at each end. The forward extensions 42 come to rest on the front portion of bottom plate 26 when the accumulation bumper 35 with arms 36 and 37 are rotated counter-clockwise to their normal position.

At a point or points of the conveyor drive chain path where the first of a group of two trucks is to be stopped, with others to accumulate in closed formation behind, a remotely controlled pair or pairs of cams are raised from floor level in known fashion to engage and lift rollers 44 until the tow pin is lifted clear of drive chain dog 29, thus bringing the tow truck to a stop.

As shown in FIG. 1, the arm 37 has an upward extention 45 which is hinged at 46 to the forward end of a connecting rod 47, on the far side and clear of a central brace 48 which is welded to a truck frame member 19 and the back plate 23 of the tow pin housing. This back plate has two cut-outs 49 and 50 which provide clearance for the right lower parts of arms 36 and 37, respectively.

On both sides of the tow pin housing 22 two fixedly mounted front bumpers are welded to the tow truck frame and tow pin housing, one one each side. These bumpers are identified by numerals 51 and 52.

REAR BUMPER ASSEMBLY

When a second truck is accumulated behind a stationary first truck, the fixedly mounted front bumpers 51 and 52 come in contact with a fixedly mounted rear bumper 53 of the first tow truck and stop the forward movement of the second tow truck. This takes place after the accumulation bumper of the second tow truck has come in to contact with and is rotated clockwisely by the rear bumper of the first tow truck and has ridden up on top of this rear bumper as shown in FIG. 4 where 10a is the first tow truck and 10 is the second.

ANTI-REBOUND DEVICE

In order to check the rebound of the second truck, a bell-crank-shaped latch lever 54 is pivoted to the sides of the rear bumper 53 by a hinge pin 55 and is provided with a hook 56 at the end of a horizontal arm, while the lower end of a vertical arm of the latch lever is hinged at 57 to the right end of connecting rod 47. Thus the latch lever is turned counter-clockwise, from the position shown at right in FIG. 1 to the position shown in FIG. 4 when the accumulation bumper 35 and arms 36 and 37 of a tow truck are turned clockwise when encountering a stationary tow truck or other obstacle, or when the rollers 44 shown in FIG. 2 are raised by a pair of remotely controlled cams.

OPERATION

Referring to FIG. 4 where truck 10a is stationary and its latch lever hook 56 is raised, the accumulation bumper 35 of an approaching tow truck 10 contacts and rides up on the rear face of rear bumper 53, and up and over the latch lever 56 until the fixedly mounted front bumpers 51 and 52 of tow truck 10 strike against the rear bumper 53 of tow truck 10a. In order to accomplish latching engagement between hook 56 of tow truck 10a and the accumulation bumper of tow truck 10, the front end of the assembly of the accumulation bumper 35 and its arms 36 and 37 is shaped like a hook 58. After impact it is necessary that the accumulation bumper, after riding over hook 56, is instantly brought down into contact with the top of rear bumper 53 of tow truck 10a. This is accomplished by the inertia of the accumulation bumper 35, its arms 36 and 37 and of the connecting rod 47, since these parts have a forward momentum. Now these parts and the latch lever hook 56 of tow truck 10a are poised for latching engagement which occurs after a short rebound of tow truck 10. In the latched position of the two tow trucks the accumulation bumper and tow pin are held in their accumulating position as show in FIG. 4 so that the drive chain pusher dogs can pass freely under the bottom of the tow pin of tow truck 10. Thus the desired function of the anti-rebound device is realized.

When the obstruction which held up the accumulation bumper 35 of tow truck 10a is removed, this bumper drops to its normal position shown in FIG. 1. As a result the tow pin and latch lever hook 56 also drop to the positions shown in FIG. 1. The tow pin of truck 10a can now be engaged by an approaching drive chain dog. At this time there is no obstacle any longer for preventing the rear bumper 53 of tow truck 10a to move clear of the accumulation bumper of tow truck 10. When this occurs the tow pin of tow truck 10 will also drop, for engagement with another chain drive dog. Therefore, of a group of accumulated tow trucks only the one which is in front can be moved forward by the drive chain, thus providing the orderly progression of operation aimed at, but without the use of expensive mechanisms.

Some installations have been made in which tow trucks as shown in FIGS. 1 to 4 are in use, but they did not have an anti-rebound device. It was found that the conveyor speed had to be substantially reducd from the intended speed in order to keep each accumulating tow truck from rebounding far enough to drop its tow pin. But the use of an inexpensive anti-rebound device according to this invention will allow normal conveyor speeds and therefore substantially increase the capacity of the system in terms of tow trucks and goods transported per hour.

MODIFICATION

With a slight modification it can be arranged that the hooking action of the accumulation bumper 35 can be taken over by a separate hinged hook lever which is mounted in front of the tow truck. But below the accumulation bumper 35 and below the level of the rear bumper 53, with the latch lever 54 being correspondingly lowered. It is intended that the claims cover such a modification.

What I claim as my invention is:

1. An accumulating tow truck for subfloor tow conveyors comprising

A body mounted on four wheels that ride on the floor, a tow pin mounted at the front end of said body and extending downwardly through a slot in the floor, the bottom end of the tow pin adapted to be engaged by a chain driven pusher dog to propel said tow truck, an accumulation bumper rotatably mounted on a front portion of said tow truck, movable hook means mounted on a front portion of said tow truck and having an inoperable and an operable position, movable latching means mounted on a rear portion of said tow truck, said latching means also having an inoperable and an operable position and being adapted to have latching engagement with said hook means of a succeeding tow truck when said latching means is in its operable position, said movable latching means at the rear of a stationary tow truck and said movable hook means at the front of a succeeding tow truck having mutually interacting surfaces which are disposed at right angles to the direction of tow truck travel when said movable latching means and said movable hook means are in their operable positions, in order to check the rebound of the succeeding tow truck, and structural means connecting said accumulation bumper with said latching means so that said latching means may be selectively moved from an inoperable position to an operable position in response to rotary movement of said accumulation bumper.

2. A tow truck according to claim 1, including means for lifting said tow pin out of engagement with said chain driven pusher dog in response to rotary movement of said accumulation bumper.

3. An accumulating tow truck for subfloor tow conveyors comprising a body mounted on four wheels that ride on the floor, a tow pin mounted at the front end of said body and extending downwardly through a slot in the floor, the bottom end of the tow pin adapted to be engaged by a chain driven pusher dog to propel said tow truck, an accumulation bumper rotatably mounted on the front portion of said tow truck, movable hook means mounted on the front portion of said tow truck, movable latching means mounted on a rear portion of said tow truck, said latching means adapted to have latching engagement with said hook means of a succeeding truck when said latching means is in its operable position, structural means connecting said accumulation bumper with said latching means so that said latching means may be selectively moved from an inoperable position to an operable position in response to rotary movement of said accumulation bumper, and a rear bumper which is fixedly mounted at the rear end of said body, and two front bumpers which are fixedly mounted at the front end of said body, on either side of said accumulation bumper and adapted to stop the forward motion of the tow truck when said fixedly mounted front bumpers come into contact with the fixedly mounted rear bumper of a stationary tow truck, such stopping of the moving truck not occuring until said hook means of the moving tow truck and said latching means of the stationary tow truck are poised for mutual latching engagement.

4. A tow truck according to claim 3, including means whereby said movable latching means of a stationary tow truck is moved to its inoperable position through said structural connecting means when an obstruction in front of said tow truck is removed, causing said accumulation bumper to rotate to a normal position.

5. A tow truck according to claim 3 in which said movable hook means at the front of the tow truck is incorporated in said accumulation bumper.

6. A tow truck according to claim 3 in which said movable hook means at the front of the tow truck is mounted as a unit which is separate from said accumulation bumper.

7. A tow truck according to claim 3 in which said movable hook means is adapted to be moved to latching position, relative to said latching means, by the utilization of inertia forces.

* * * * *